United States Patent
Casek et al.

(10) Patent No.: US 11,210,959 B2
(45) Date of Patent: Dec. 28, 2021

(54) CHANGING A QUALITY PARAMETER IN A SURVEILLANCE MESSAGE IN RESPONSE TO A REPLY MESSAGE

(71) Applicant: Honeywell International s.r.o., Chodov (CZ)

(72) Inventors: Petr Casek, Brno (CZ); Eva Gelnarova, Brno (CZ)

(73) Assignee: Honeywell International S.R.O., Chodov (CZ)

(*) Notice: Subject to any disclaimer, the term of this patent is extended or adjusted under 35 U.S.C. 154(b) by 201 days.

(21) Appl. No.: 16/516,789

(22) Filed: Jul. 19, 2019

(65) Prior Publication Data

US 2021/0005096 A1  Jan. 7, 2021

Related U.S. Application Data

(60) Provisional application No. 62/870,920, filed on Jul. 5, 2019.

(51) Int. Cl.
  *G08G 5/04* (2006.01)
  *G08G 5/00* (2006.01)
  *G01S 13/78* (2006.01)

(52) U.S. Cl.
  CPC .......... *G08G 5/045* (2013.01); *G01S 13/782* (2013.01); *G08G 5/0008* (2013.01);
  (Continued)

(58) Field of Classification Search
  CPC .... G08G 5/045; G08G 5/0008; G08G 5/0013; G08G 5/0078; G08G 5/0082; G08G 5/0095; G01S 13/782
  See application file for complete search history.

(56) References Cited

U.S. PATENT DOCUMENTS 7,429,950 B2   9/2008  Smith et al.
2006/0119515 A1*  6/2006  E. Smith .............. G01S 13/933
                                          342/450

(Continued)

OTHER PUBLICATIONS

Syd Ali, Busyairah et al., "Analysis of anomalies in ADS-B and its GPS data," Jul. 2016, GPS Solut, 20, pp. 429-438 (Year: 2016).*

(Continued)

*Primary Examiner* — Aniss Chad
*Assistant Examiner* — Madison R Hughes
(74) *Attorney, Agent, or Firm* — Shumaker & Sieffert, P.A.

(57) ABSTRACT

In some examples, a system that mounts on a vehicle includes a transceiver configured to transmit a first surveillance message including a first value for a quality parameter, wherein the first value indicates a first level of integrity or accuracy for the first surveillance message. The transceiver is also configured to receive a reply message to the first surveillance message. The system also includes processing circuitry configured to determine a second value for the quality parameter in response to the transceiver receiving the reply message, wherein the second quality parameter indicates a second level of integrity or accuracy for surveillance messages transmitted by the transceiver, and wherein the second level of integrity or accuracy is higher than the first level. The transceiver is configured to transmit a second surveillance message including the second value for the quality parameter in response to the processing circuitry determining the second quality parameter.

18 Claims, 6 Drawing Sheets

(52) U.S. Cl.
CPC ......... *G08G 5/0013* (2013.01); *G08G 5/0078* (2013.01); *G08G 5/0082* (2013.01); *G08G 5/0095* (2013.01)

(56) References Cited

U.S. PATENT DOCUMENTS

| | | |
|---|---|---|
| 2012/0262339 A1 | 10/2012 | Garcia et al. |
| 2017/0029107 A1* | 2/2017 | Emami ................ G08G 5/0069 |
| 2018/0172797 A1 | 6/2018 | Hauswald et al. |
| 2018/0315323 A1 | 11/2018 | Winkler |

OTHER PUBLICATIONS

Schuster, Wolfgang et al., "Integrity monitoring algorithms for airport surface movement," 2012, GPS Solut, 16, pp. 65-75 (Year: 2012).*

"ADS-B for Dummies—1090 MHz Extended Squitter," European Organisation for the Safety of Air Navigation, Eurocontrol, accessed on or about Jun. 6, 2019, 25 pp.

Hempe, "Advisory Circular 20-165," U.S. Department of Transportation—Federal Aviation Administration, May 21, 2010, 67 pp.

"Automatic Dependent Surveillance—Broadcast (ADS-B)—Flight Inspection Analysis and Coverage Report," Federal Aviation Administration, Sep. 13-14, 2011, 32 pp.

"ADS-B in a General Aviation Context," Eurocontrol, UK CAA, NATS and AOPA UK, May 2018, 20 pp.

U.S. Appl. No. 62/840,852, by Petr Casek et al., filed Apr. 30, 2019.

* cited by examiner

CHANGING A QUALITY PARAMETER IN A SURVEILLANCE MESSAGE IN RESPONSE TO A REPLY MESSAGE

PRIORITY CLAIM

This application claims benefit to U.S. Provisional Application No. 62/870,920, filed on Jul. 5, 2019, the entire content of which is incorporated herein by reference.

GOVERNMENT INTEREST

The project leading to this application has received funding from the Single European Sky Air Traffic Management Research (SESAR) Joint Undertaking under grant agreement No. 783198 under European Union's Horizon 2020 research and innovation programme.

TECHNICAL FIELD

This disclosure relates to status broadcasts and position reporting for vehicles.

BACKGROUND

The transmission of surveillance messages by vehicles can strongly improve the traffic situation awareness and safety of other vehicles. For example, a first aircraft with automatic-dependent surveillance—broadcast (ADS-B) Out capability can transmit the position and velocity of the first aircraft to other aircraft in the area. ADS-B Out capability is becoming more widely adopted and mandated worldwide, but especially in the United States. For example, Title 91, Sections 225 and 227 of the Code of Federal Regulations requires an ADS-B with particular levels of integrity or accuracy for certain airspaces.

Unless mandated (as in the United States), ADS-B Out is not used by large number of general aviation (GA) aircraft and rotorcraft, as well as vehicles like drones or air taxi. The low deployment is primarily due to high cost of certified equipment. The quality and class of the onboard equipment/installation is reflected in the surveillance messages through quality parameters (e.g., quality indicators) that provide an indication of the system integrity or the system design assurance level. A surveillance message may include several data fields, where one or more of the data fields is reserved for quality parameter(s).

The certification requirements can be split to two main parts: Global Navigation Satellite System (GNSS) receiver and ADS-B Out transmitter. While commercial off-the-shelf GNSS receiver can be used for some GA-tailored products, the quality indicators in surveillance messages may be set so low that the information in the surveillance message is not usable by many receivers (e.g., safety-critical applications).

SUMMARY

In general, this disclosure relates to systems, devices, and techniques for transmitting surveillance messages including a field for vehicle data and a field for a quality parameter that indicates a level of integrity or accuracy for the vehicle data. A transceiver can transmit a first surveillance message including a first value for the quality parameter indicating a first level of integrity or accuracy. In response to the transceiver receiving a reply message, processing circuitry can determine a new value for the quality parameter that indicates a second level of integrity or accuracy that is higher than the first level of integrity or accuracy. The processing circuitry can then cause the transceiver to transmit a second surveillance message including the new value for the quality parameter.

In some examples, a system that mounts on a vehicle includes a transceiver configured to transmit a first surveillance message including a first field with a first value for a quality parameter and a second field with vehicle data, wherein the first value indicates a first level of integrity or accuracy for the first surveillance message. The transceiver is also configured to receive a reply message to the first surveillance message. The system also includes processing circuitry configured to determine a second value for the quality parameter in response to the transceiver receiving the reply message, wherein the second value for the quality parameter indicates a second level of integrity or accuracy for surveillance messages transmitted by the transceiver, and wherein the second level of integrity or accuracy is higher than the first level of integrity or accuracy. The transceiver is configured to transmit a second surveillance message including the first field with the second value for the quality parameter in response to the processing circuitry determining the second value.

In some examples, a method includes transmitting, by a transceiver onboard a vehicle, a first surveillance message including a first field with a first value for a quality parameter and a second field with vehicle data, the first value indicating a first level of integrity or accuracy for the first surveillance message. The method also includes receiving, by the transceiver, a reply message to the first surveillance message. The method further includes determining, by processing circuitry coupled to the transceiver, a second value for the quality parameter in response to the transceiver received the reply message, wherein the second value for the quality parameter indicates a second level of integrity or accuracy for surveillance messages transmitted by the transceiver, and wherein the second level of integrity or accuracy is higher than the first level of integrity or accuracy. The method includes transmitting, by the transceiver, a second surveillance message including the first field with the second value for the quality parameter in response to determining the second value.

In some examples, a system is configured to be part of a navigation system, and the system includes at least one transceiver configured to receive a first surveillance message including a first field with a first value for a quality parameter and a second field with vehicle data, the first value indicating a first level of integrity or accuracy for the first surveillance message. The system also includes processing circuitry configured to determine that an integrity or an accuracy of the vehicle data in the first surveillance message is higher than a threshold level. The at least one transceiver is further configured to transmit a reply message to the vehicle instructing the vehicle to increase the first value for the first quality parameter in response to the processing circuitry determining that the integrity or the accuracy of the vehicle data in the first surveillance message is higher than the threshold level.

The details of one or more examples of the disclosure are set forth in the accompanying drawings and the description below. Other features, objects, and advantages will be apparent from the description, drawings, and claims.

DETAILED DESCRIPTION

Various examples are described below for changing the value for a quality parameter in a surveillance message in response to receiving a reply message. A vehicle that transmits surveillance messages may receive a reply message from a navigation system instructing the vehicle to increase its value for quality parameter. After receiving the reply message, the vehicle can transmit surveillance messages including an increased value for the quality parameter, which can increase the usefulness of the surveillance equipment on the vehicle.

The techniques of this disclosure allow for an inexpensive Global Navigation Satellite System (GNSS) receiver to be used with an automatic-dependent surveillance—broadcast (ADS-B) Out device by having a ground-based service or a cloud-based service that monitors the performance of the system. If the ground-based service guarantees the quality of the ADS-B Out device, the ADS-B Out device can increase the values for quality parameters to allow more critical ADS-B In services to use the data transmitted by the ADS-B Out device. Inexpensive GNSS receivers often have low values for quality parameters that are not high enough for ADS-B In applications to use. Thus, general aviation (GA) aircraft and urban air mobility (UAM) systems may be able to use inexpensive equipment that can be verified by the ground- or cloud-based service. The techniques of this disclosure may apply not only to ADS-B messages but also to other surveillance protocols such as Traffic Alert and Collision Avoidance System (TCAS), automatic identification system (AIS), and surveillance protocols for autonomous vehicles.

Figure 1:
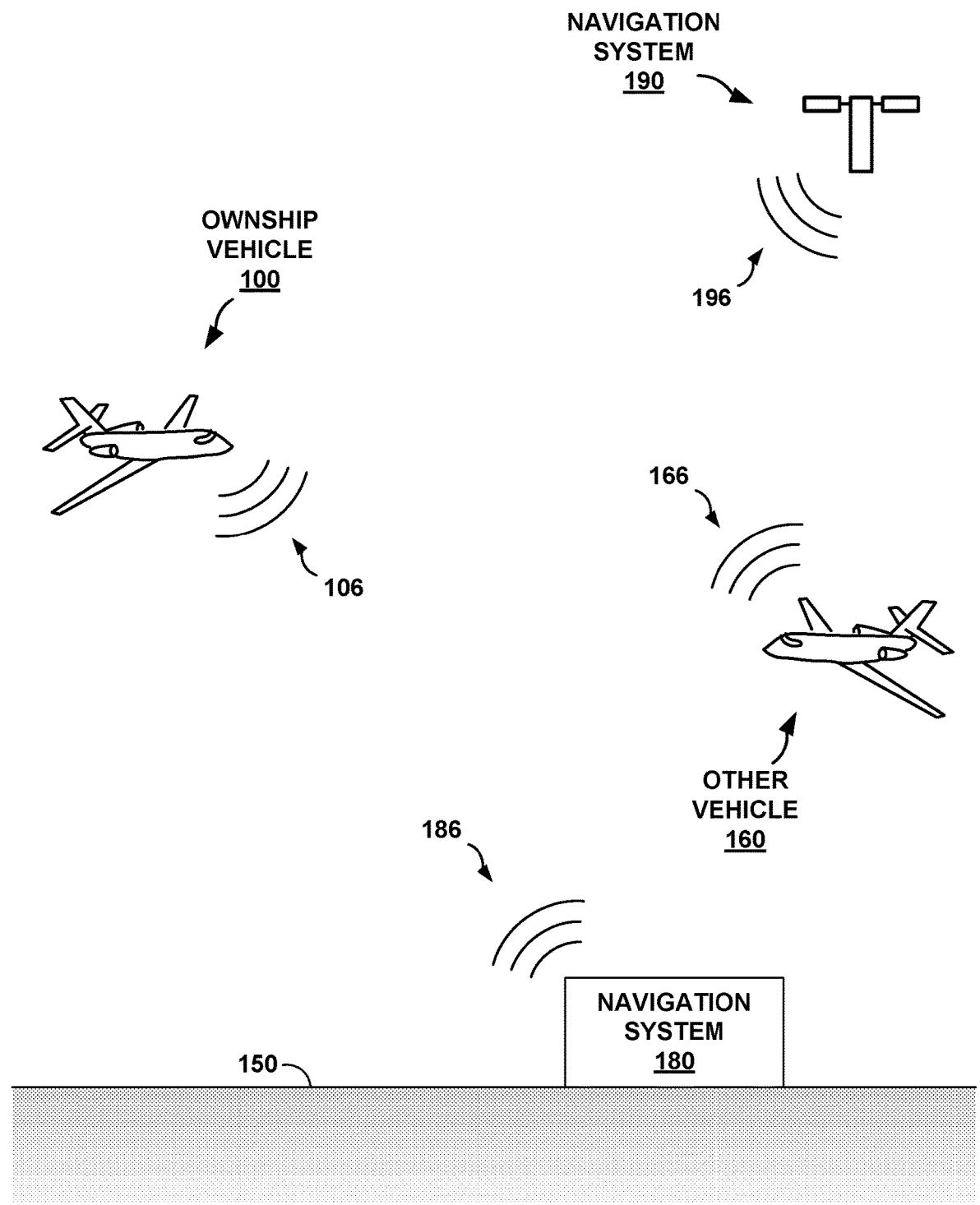
FIG. 1 is a conceptual block diagram of a vehicle transmitting a surveillance message including a field for a quality parameter, in accordance with some examples of this disclosure.

FIG. 1 is a conceptual block diagram of a vehicle 100 transmitting surveillance message 106 including a field for a quality parameter, in accordance with some examples of this disclosure. Vehicles 100 and 160, as well as navigation systems 180 and 190 may be configured to send and/or receive surveillance messages 106, 166, 186, and 196. Vehicle 100 is referred to as the "ownship vehicle," because FIG. 1 is described from the perspective of a system of this disclosure mounted onboard vehicle 100.

Although vehicles 100 and 160 are depicted in FIG. 1 as airplanes, vehicles 100 and 160 can be any other vehicle or non-vehicle mobile object. In some examples, vehicles 100 and 160 may be an aircraft other than an airplane, such as a helicopter or a weather balloon. Vehicles 100 and 160 may be space vehicles such as satellites or spaceships. In yet other examples, Vehicles 100 and 160 may be land vehicles such as automobiles or water vehicles such as ships or submarines. Vehicles 100 and 160 can be manned vehicles or unmanned vehicles, such as drones, remote-control vehicles, or any suitable vehicle without any pilot or crew on board.

Navigation systems 180 and 190 can be any entity that transmits reply messages in response to surveillance message 106. Navigation system 180 can be land-based base station located on ground surface 150 that transmits reply messages in response to surveillance message 106. In some examples, navigation system 180 can be a marine base station. Navigation system 190 can be satellite or another airborne entity that transmits reply messages in response to surveillance message 106. In addition, another vehicle such as vehicle 160 can act as a navigation system to transmits reply messages in response to surveillance message 106. Navigation system 180 and/or 190 may be configured to aggregate and distribute vehicle data for vehicles 100 and 160. Navigation system 180 and/or 190 may be configured to act as a traffic management system such as an Air Traffic Controller (ATC) or an autonomous vehicle traffic management system. Vehicle 100 may communicate with vehicle 160 and/or navigation systems 180 or 190 through a secured communication link, such as an encrypted communication link.

Vehicle 100 is configured to determine the location, velocity, and/or altitude of vehicle 100. Vehicle 160 can determine the location, velocity, and/or altitude of vehicle 100. Each of vehicles 100 and 160 may include a GNSS, an inertial navigation system (INS) for determining a turn rate, velocity, and acceleration for the respective vehicle 100 or 160. Each of vehicle 100 and 160 may include an altimeter, an accelerometer, an attitude and heading reference system, and/or other sensors and means for determining velocity and other parameters of the respective vehicle 100 or 160.

Vehicles 100 and 160 transmit surveillance messages 106 and 166 including fields for vehicle data and one or more quality parameters. The vehicle data in surveillance message 106 may include information such as the position, velocity, and/or altitude of vehicle 100. The vehicle data in surveillance message 106 may also include information such as the origin and destination of vehicle 100, the heading of vehicle, the type of vehicle 100 (e.g., Boeing 737, Airbus A320, Freightliner CL, DJI Phantom, etc.)

Surveillance messages 106 and 166 may be periodic, unprompted broadcasts and/or replies to interrogation messages received from vehicles 100 and 160 and/or base station 180. The surveillance signals can include any form of positioning reporting signals, including ADS-B, TCAS, AIS, and/or any other type of position reporting. The standard frequency for ADS-B messages is 1090 MHz. The standard frequency for TCAS interrogation messages is 1030 MHz, and the standard frequency for TCAS reply messages and TCAS broadcast messages is 1090 MHz.

The quality parameters in surveillance message 106 can include quality parameters for the latitude and longitude of vehicle 100, the altitude of vehicle 100, and/or the velocity of vehicle 100. Examples of quality parameters for ADS-B are the Navigation Accuracy Category (NAC), the Navigation Integrity Category (NIC), the Surveillance Integrity Level (SIL), the Barometric Altitude Quality, and the System Design Assurance. Example details of quality parameters in ADS-B messages can be found in Advisory Circular 20-165 by the released by the FAA on May 21, 2010, the entirety of which is incorporated herein by reference.

Vehicle 160 and navigation systems 180 and 190 receive surveillance message 106 transmitted by vehicle 100. In some examples, vehicle 160 and navigation systems 180 and 190 may transmit a reply message to vehicle 100 to indicate that surveillance message 106 was received. Vehicle 160 can send a reply message in response to determining that there may be a collision risk between vehicles 100 and 160. Navigation systems 180 and 190 can also send reply messages instructing vehicle 100 to change course or take a particular maneuver. In some examples, navigation systems 180 and 190 can rebroadcast surveillance message 106 as an automatic-dependent surveillance—rebroadcast message. Navigation systems 180 and 190 can also request additional parameters from vehicle 100 similar to the enhanced surveillance capability of mode S.

Vehicle 100 may be equipped with a transceiver and/or surveillance equipment that has a relatively low level of integrity or accuracy. Thus, vehicle 100 can determine a first value for a quality parameter indicating the low level of integrity or accuracy and transmit surveillance message 106 including the first quality parameter. Vehicle 160 and/or navigation systems 180 and 190 may not be able to use the vehicle data in surveillance message 106 because of the low value for the quality parameter. For example, there are safety-critical applications and safety-critical system (or systems operating in safety-critical areas) that cannot use the vehicle data in surveillance message 106 in examples in which the values for the quality parameters of surveillance message 106 are less than a threshold level.

In accordance with the techniques of this disclosure, vehicle 160 and/or navigation systems 180 and 190 may be configured to verify the vehicle data in surveillance message 106 and determine that the integrity or accuracy of the vehicle data in surveillance message 106 is greater than a threshold level. In response to determining that integrity or accuracy of the vehicle data in surveillance message 106 is greater than a threshold level, vehicle 160 and/or navigation systems 180 and 190 can transmit a reply message to vehicle 100 instructing vehicle 100 to use a value for the quality parameter indicating a level of integrity or accuracy that is higher than the level of integrity or accuracy indicated by surveillance message 106.

Vehicle 160 and navigation systems 180 and 190 can determine that the vehicle data in surveillance message 106 has integrity or accuracy greater than a threshold level by comparing the vehicle data to other data sources. For example, vehicle 160 and navigation systems 180 and 190 can compare the vehicle data to the characteristics of surveillance message 106. The characteristics of surveillance message 106 can include the angle and phase of arrival of the signals carrying surveillance message 106. Vehicle 160 and navigation systems 180 and 190 can use the signal characteristics to estimate the location, velocity, and altitude of vehicle 100. Vehicle 160 and navigation systems 180 and 190 can compare the estimates of the location, velocity, and altitude of vehicle 100 to the location, velocity, and altitude of vehicle 100 indicated in the vehicle data of surveillance message 106.

Vehicle 160 and navigation systems 180 and 190 can also compare the vehicle data to a location, velocity, and/or altitude of vehicle 100 determined from returns from a radar or another sensor. For example, vehicle 160 and navigation systems 180 and 190 can verify the level of integrity or accuracy in surveillance message 106 based on the comparison of the vehicle data and the location, velocity, and/or altitude of vehicle 100 based on the returns.

For example, the value for the quality parameter in surveillance message 106 may indicate that the vehicle data in surveillance message 106 is accurate to within five hundred meters. By comparing the vehicle data to the other data sources, vehicle 160 and/or navigation system 180 or 190 may determine that the location indicated by the vehicle data is within ten meters of the location indicated by the other data sources. Vehicle 160 and/or navigation system 180 or 190 may select a threshold level is a higher level of integrity or accuracy than the level indicated by surveillance message 106 (e.g., one hundred meters). In response to determining that the vehicle data in surveillance message 106 is within ten meters of the location determined from the other data source, vehicle 160 and/or navigation system 180 or 190 can determine that the vehicle data in surveillance message 106 is higher than a threshold level (e.g., one hundred meters or accuracy).

In some examples, vehicle 160 and navigation systems 180 and 190 may be configured to verify the accuracy or integrity of more than one surveillance message received from vehicle 100 before sending the reply message instructing vehicle 100 to increase the value for the quality parameter transmitted by vehicle 100. Verifying the accuracy or integrity of more than one surveillance message can increase the confidence for determining that the level of integrity or accuracy of the surveillance messages is greater than the threshold level.

A connected system including multiple receivers can verify the accuracy or integrity of surveillance messages. In examples in which multiple vehicles around vehicle 100 receive surveillance message 106, each of the receivers can verify the accuracy or integrity of surveillance message 106 and transmit the results of the verification to aggregator. The aggregator (vehicle 160 and/or system 180 or 190) can determine whether to transmit a reply message to vehicle 100 instructing vehicle 100 to increase the value for the quality parameter.

The techniques of this disclosure may be especially useful for low-cost transceivers and low-cost surveillance systems that use quality parameter values indicating low levels of integrity or accuracy. A vehicle with low-cost equipment (e.g., a GA aircraft or an unmanned aerial vehicle (UAV)) may transmit surveillance reports or applications with a low quality parameter value, which may preclude some systems from using the vehicle data in the surveillance reports or applications. A low quality parameter value may bar the vehicle from operating in an area with high performance requirements such in an urban area, a high-traffic area, near an airport, or near critical infrastructure. A navigation system or vehicle that verifies the integrity or accuracy of the vehicle data in the surveillance messages exceeds a threshold level can send a reply message to the transmitting vehicle instructing the vehicle to increase the quality parameter value in the surveillance messages. By increasing the quality parameter value, the transmitting vehicle can provide vehicle data that can be used by more systems, as compared to transmitting surveillance messages with the lower quality parameter value.

The techniques of this disclosure can reduce certification requirements or assurance level for onboard surveillance equipment (e.g., a transceiver) and thus reduce the cost of the equipment. The equipment can have the value for the quality parameter set to a low default value to reflect the low assurance level. The remote navigation systems 180 and 190, or in some examples vehicle 160, can complement the onboard equipment device by continuously monitoring the performance of the onboard equipment. In examples in which navigation system 180 or 190 remotely guarantees or verifies the quality of broadcasted information as the ground service, the surveillance equipment onboard vehicle 100 can raise the quality parameter values included in future surveillance messages. With a higher value for the quality parameter, the future surveillance messages will be useful for critical applications.

The techniques of this disclosure provide scalability of the operational requirements based on the environment and the availability of verifying navigation systems. Vehicle 100 can have relatively inexpensive avionics that are good enough for flying in low-density areas (e.g., rural areas). When flying in more demanding airspace (e.g., urban areas), navigation systems 180 and 190 can enhance the integrity of the system onboard vehicle 100 to meet stricter operational requirements.

Figure 2:
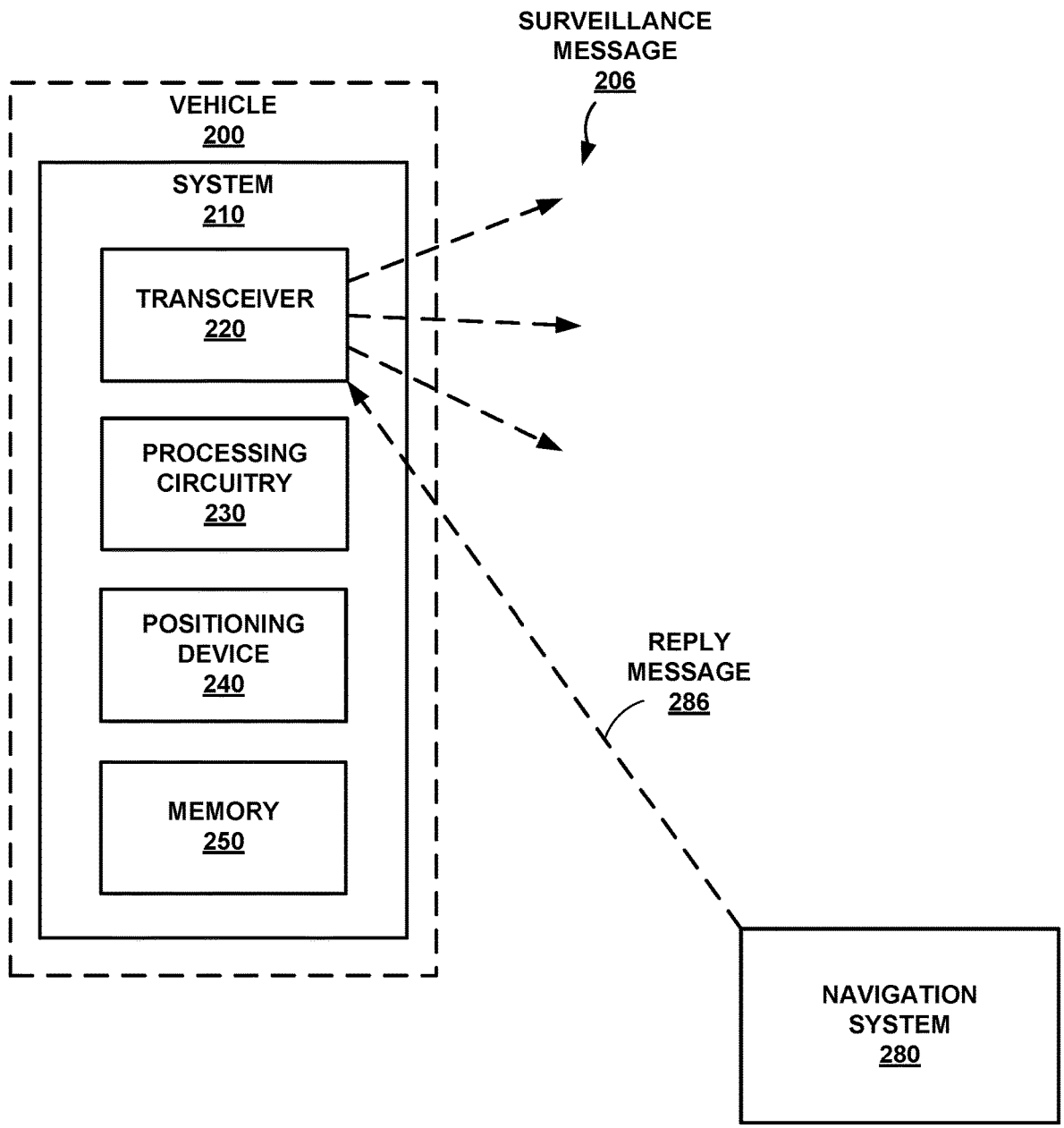
FIG. 2 is a conceptual block diagram of a vehicle transmitting a surveillance message, in accordance with some examples of this disclosure.

FIG. 2 is a conceptual block diagram of a vehicle 200 transmitting surveillance message 206, in accordance with some examples of this disclosure. System 210 includes transceiver 220, processing circuitry 230, positioning device 240, and memory 250. System 210 may include additional elements not shown in FIG. 1, such as an altimeter, an accelerometer, an attitude and heading reference system, and/or other sensors and means for determining velocity and other parameters of vehicle 200. Although FIG. 1 shows transceiver 220, processing circuitry 230, positioning device 240, and memory 250 as separate components for ease of illustration, these components may be separate or highly integrated in an actual implementation.

System 210 may also include an inertial navigation system (INS) for determining a turn rate, velocity, and acceleration for vehicle 200. The INS may be sufficient for stand-alone navigation of vehicle 200 without determining the locations of other vehicles. If system 210 does not have INS (e.g., GA and UAVs), system 210 may include another source of redundant navigation information, such as signals from navigation system 280.

System 210 may be configured to receive inputs from an operator of vehicle 200, such as an input to accelerate, decelerate, brake, or turn vehicle 200. System 210 can also receive information regarding the status of vehicle 200, such as whether vehicle 200 is parked, moving, on the ground, in the air, taking off, landing, and so on.

Transceiver 220 is configured to transmit surveillance message 206 to other vehicles and stationary receivers. Transceiver 220 is also configured to receive reply message from navigation system 280. Transceiver 220 may include an ADS-B device capable of transmitting ADS-B signals to other vehicles. In other words, transceiver 220 may include an ADS-B Out transmitter. Transceiver 220 may include or be part of a Mode S transponder or a Mode C transponder.

Surveillance message 206 can include data indicating the position, velocity, and other information relating to system 210 and vehicle 200. For example, processing circuitry 230 can determine the location, velocity, track, status, and destination of vehicle 200. In some examples, surveillance message 206 includes ADS-B data, where each surveillance message lays out the data in a squitter format. In examples in which surveillance message 206 includes ADS-B data, surveillance message 206 can encode data at a frequency of 1090 MHz. Surveillance message 206 can also encode ADS-B data at a frequency of 978 MHz for universal access transceiver (UAT) transmissions.

Positioning device 240 is configured to determine the position or location of vehicle 200. Positioning device 240 may include satellite navigation equipment such as a GNSS configured to receive positioning signals from satellites and other transmitters. One example of a GNSS is a Global Positioning System (GPS). Positioning device 240 may be configured to deliver the received positioning signals to processing circuitry 230, which may be configured to determine the position of vehicle 200. Processing circuitry 230 can encode the position and/or velocity in surveillance message 206 transmitted by transceiver 220.

Memory 250 may be configured to store data indicating the locations, velocities, and other navigational data for vehicle 200. Memory 250 can also store quality parameter values and levels of integrity and accuracy. In some examples, memory 250 may store program instructions, which may include one or more program modules, which are executable by processing circuitry 230. When executed by processing circuitry 230, such program instructions may cause processing circuitry 230 to provide the functionality ascribed to it herein. The program instructions may be embodied in software and firmware. Memory 250 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Navigation system 280 receives surveillance message 206 that includes a value for a quality parameter indicating a first level of integrity or accuracy. Navigation system 280 determines a separate level of integrity or accuracy for the vehicle data in surveillance message 206 by comparing the vehicle data to another source of data (e.g., radar, other sensor, or the signal characteristics of surveillance message 206) for the location, velocity, and/or altitude of vehicle 200. In response to determining that the vehicle data in surveillance message 206 is within a threshold range of the data from another source, navigation system 280 can transmit reply message 286 instructing system 210 to increase the quality parameter value in future surveillance messages.

Navigation system 280 may be configured to communicate with and direct the movements of vehicle 200 and other vehicles. Navigation system 280 can provide ground surveillance for unmanned aerial vehicle traffic in the area around system 280. Navigation system 280 can include an ATC, an unmanned aircraft system traffic management (UTM) system in the United States, or a U-Space system in Europe.

Processing circuitry 230 is configured to determine whether transceiver 220 has received reply message 286. Processing circuitry 230 can decode the messages received by transceiver 220 to determine whether transceiver 220 has received reply message 286 instructing system 210 to increase the quality parameter value. In response to determining that transceiver 220 has not received message 286, processing circuitry 230 can reuse the same quality parameter value as in a previous surveillance message.

The techniques of this disclosure are applicable and adaptable to ADS-B systems and other types of systems. As an ADS-B system, system 210 can offer an affordable ADS-B solution for a large spectrum of new users, even for users with some alternative, and not compatible, system like Flight Alarm (FLARM) or another drone kit. A cloud-based monitoring function performed by navigation system 280 can allow system 210 to increase the assurance level in particular areas of interest such as urban areas for urban air mobility. The operator of vehicle 200 would benefit from lower-cost equipment with good functionality, and the operator of navigation system could earn a fee from providing verification services. There can be a level of certification for navigation system operators in order to promote high-quality verification.

Figure 3:
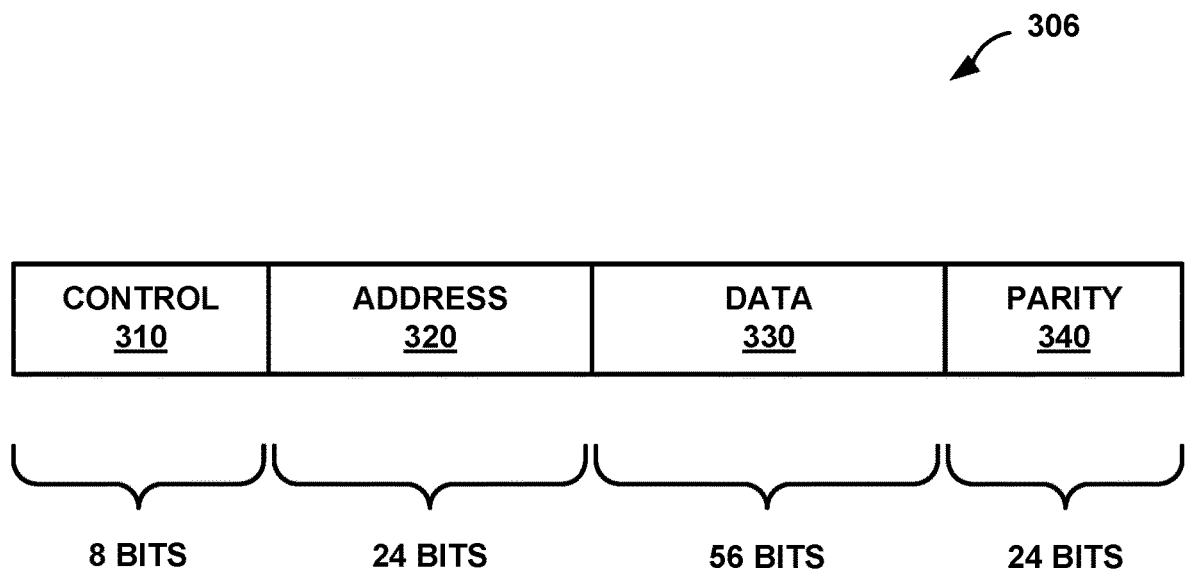
FIG. 3 is a diagram showing the fields of an example surveillance message, in accordance with some examples of this disclosure.

FIG. 3 is a diagram showing the fields of an example surveillance message 306, in accordance with some examples of this disclosure. FIG. 3 is an example of an extended squitter ADS-B message with four fields: control field 310, and address field 320, data field 330, and parity field 340. For an extended squitter ADS-B message, control field 310 has eight bits, address field 320 has twenty-four bits, data field 330 has fifty-six bits, and parity field 340 has twenty-four bits. Each of fields 310, 320, 330, and 340 may include one or more sub-fields, as referred to as just "fields."

Data field 330 may include fields for parameters such as position, altitude, heading, vehicle status, and/or one or more fields for quality parameters. For example, one or more bits within data field 330 can represent or define a quality parameter. The one or more bits may be referred to as a field. A vehicle can set the quality parameter bits based on a determined level of integrity or accuracy. The bits of the quality parameter (e.g., the value of the quality parameter) indicate the level of integrity or accuracy for some or all of the vehicle data in surveillance message 306. The vehicle can increase the value for the parameter by increasing the value of the bits representing the quality parameter. For example, the vehicle can increase the quality parameter by changing the value of the quality parameter bits to a higher value, such as from four (e.g., 0100 in binary) to seven (e.g., 0111 in binary).

As described below, the quality parameter(s) in surveillance message 306 can indicate the level of integrity or accuracy of the position of a vehicle, such as the latitude and longitude of the vehicle. Additionally or alternatively, the values for the quality parameters can indicate the level of integrity or accuracy of the altitude and/or velocity of the vehicle. Surveillance message 306 may have a single quality parameter for the vehicle data in surveillance message 306, or surveillance message 306 may have multiple quality parameters, where the value for each quality parameter indicates the level of integrity or accuracy for a specific piece of the vehicle data.

The Navigation Integrity Category (NIC) is one example of a quality parameter that indicates the level of integrity for the position of a vehicle. As used in ADS-B messages, the NIC specifies an integrity containment radius. An ADS-B system can derive the NIC from the output of an approved position source, such as the horizontal protection level from a GNSS device. One or more bits within data field 330 can define the NIC. A value of seven for the NIC is required by Federal Aviation Administration (FAA) regulations to operate in certain airspace.

Table I shows example values for the NIC. In the example of Table I, the NIC is a four-bit quality parameter with values from zero to eleven. The values in the left column of Table I are examples of values for a quality parameter, and the values in the right column represent the level of integrity indicated by each quality parameter value.

TABLE I

NIC values for ADS-B.

| NIC | Containment bounds |
|---|---|
| 0 | $R_C \geq 37.04$ km (20 nm) |
| 1 | $R_C < 37.04$ km (20 nm) |
| 2 | $R_C < 14.816$ km (8 nm) |
| 3 | $R_C < 7.408$ km (4 nm) |
| 4 | $R_C < 3.704$ km (2 nm) |
| 5 | $R_C < 1852$ m (1 nm) |
| 6 | $R_C < 1111.2$ m (0.6 nm) |
| 7 | $R_C < 370.4$ m (0.2 nm) |
| 8 | $R_C < 185.2$ m (0.1 nm) |
| 9 | $R_C < 75$ m and VPL < 112 m |

TABLE I-continued

NIC values for ADS-B.

| NIC | Containment bounds |
|---|---|
| 10 | $R_C < 25$ m and VPL < 37.5 m |
| 11 | $R_C < 7.5$ m and VPL < 11 m |

The Navigation Accuracy Category for Position ($NAC_P$) is another quality parameter that indicates the level of accuracy of the horizontal position information (e.g., latitude and longitude). The ADS-B equipment derives a $NAC_P$ value from the position source's accuracy output, such as the horizontal figure of merit from a GNSS receiver. A value of eight for the $NAC_P$ is required by FAA regulations to operate in certain airspace. Table II shows example values for the $NAC_P$. In the example of Table II, the $NAC_P$ is a four-bit quality parameter with values from zero to eleven. Thus, the field for the $NAC_P$ is four bits long in the example of Table II. The values in the left column of Table II are examples of values for a quality parameter, and the values in the right column represent the level of accuracy indicated by each quality parameter value.

TABLE II $NAC_P$ values for ADS-B.

| $NAC_P$ | Accuracy bounds |
|---|---|
| 0 | EPU ≥ 18.52 km (10 nm) |
| 1 | EPU < 18.52 km (10 nm) |
| 2 | EPU < 7.408 km (4 nm) |
| 3 | EPU < 3.704 km (2 nm) |
| 4 | EPU < 1852 m (1 nm) |
| 5 | EPU < 926 m (0.5 nm) |
| 6 | EPU < 555.6 m (0.3 nm) |
| 7 | EPU < 185.2 m (0.1 nm) |
| 8 | EPU < 92.6 m (0.05 nm) |
| 9 | EPU < 30 m and VEPU < 45 m |
| 10 | EPU < 10 m and VEPU < 15 m |
| 11 | EPU < 3 m and VEPU < 4 m |

The Navigation Accuracy Category for Velocity ($NAC_V$) is a quality parameter that indicates the level of accuracy of the horizontal velocity of the vehicle. Table III shows example values for the $NAC_V$. In the example of Table III, the $NAC_V$ is a three-bit quality parameter with values from zero to four. The values in the left column of Table III are examples of values for a quality parameter, and the values in the right column represent the level of accuracy indicated by each quality parameter value.

TABLE III $NAC_V$ values for ADS-B.

| $NAC_V$ | Horizontal velocity error (95%) | Vertical velocity error (95%) |
|---|---|---|
| 0 | Unknown or ≥ 10 m/s | Unknown or ≥ 50 ft/s (15.24 m/s) |
| 1 | < 10 m/s | < 50 ft/s (15.24 m/s) |
| 2 | < 3 m/s | < 15 ft/s (4.57 m/s) |
| 3 | < 1 m/s | < 5 ft/s (1.52 m/s) |
| 4 | < 0.3 m/s | < 1.5 ft/s (0.46 m/s) |

The Source Integrity Level (SIL) is another quality parameter that indicates the probability that the horizontal position is outside of the radius of containment indicated by the NIC. A value of three for the SIL is required by FAA regulations to operate in certain airspace. Table IV shows example values for the SIL. In the example of Table IV, the SIL is a two-bit quality parameter with values from zero to three. The values in the left column of Table IV are examples of values for a quality parameter, and the values in the right column represent the level of accuracy indicated by each quality parameter value.

TABLE IV

SIL values for ADS-B.

| SIL | Probability of exceeding the RC integrity container radius without detection | Comment |
|---|---|---|
| 0 | Unknown | "No Hazard Level" Navigation Source |
| 1 | $1 \times 10^{-3}$ per flight hour or per operation | "Minor Hazard Level" Navigation Source |
| 2 | $1 \times 10^{-5}$ per flight hour or per operation | "Major Hazard Level" Navigation Source |
| 3 | $1 \times 10^{-7}$ per flight hour or per operation | "Severe Major Hazard Level" Navigation Source |

In some examples, a vehicle transmits surveillance message 306 with a $NAC_P$ value of four indicating that the integrity containment radius for the vehicle data is less than 1.85 kilometers. A navigation system can receive the surveillance message and determine the vehicle position stated in the surveillance message. The navigation system can also determine the vehicle position using another data source, such as the signal characteristics of the surveillance message and/or radar returns reflected off the vehicle. In response to determining that a difference between the two determinations of the vehicle position is less than a certain amount (e.g., two hundred meters), the navigation system can determine that the accuracy of the vehicle data is greater than a threshold level. The threshold level may be a higher level of integrity or accuracy than the first level of integrity or accuracy. A higher level of integrity or accuracy can have a smaller containment radius or a lower probability of error.

In response to determining that the accuracy of the vehicle data is greater than a threshold level, the navigation system can transmit a signal to the vehicle instructing the vehicle to increase the $NAC_P$ quality parameter value (e.g., to a value of six) for future surveillance messages. The navigation system can instruct the vehicle to increase the value of only one quality parameter or multiple quality parameter values in some examples. The navigation system can instruct the vehicle to increase the quality parameter to a specified level or value, or the navigation system can communicate to vehicle the level of integrity or accuracy determined by the navigation system when the navigation system verified the surveillance message.

A navigation system can determine whether the vehicle data in surveillance message 306 is sufficient for or satisfies a threshold level of integrity or accuracy. In some examples, the threshold level of integrity or accuracy is a higher level of integrity or accuracy than the first level of integrity or accuracy indicated by a quality parameter in a surveillance message. For example, the quality parameter may indicate that a level of integrity or accuracy within one kilometer. The navigation system can determine whether the accuracy or integrity of the vehicle data is higher than a threshold level, such as one or two hundred meters, which is a higher level of integrity or accuracy than the level of integrity or accuracy indicated by the quality parameter in surveillance message 306 (e.g., one kilometer).

Figure 4:
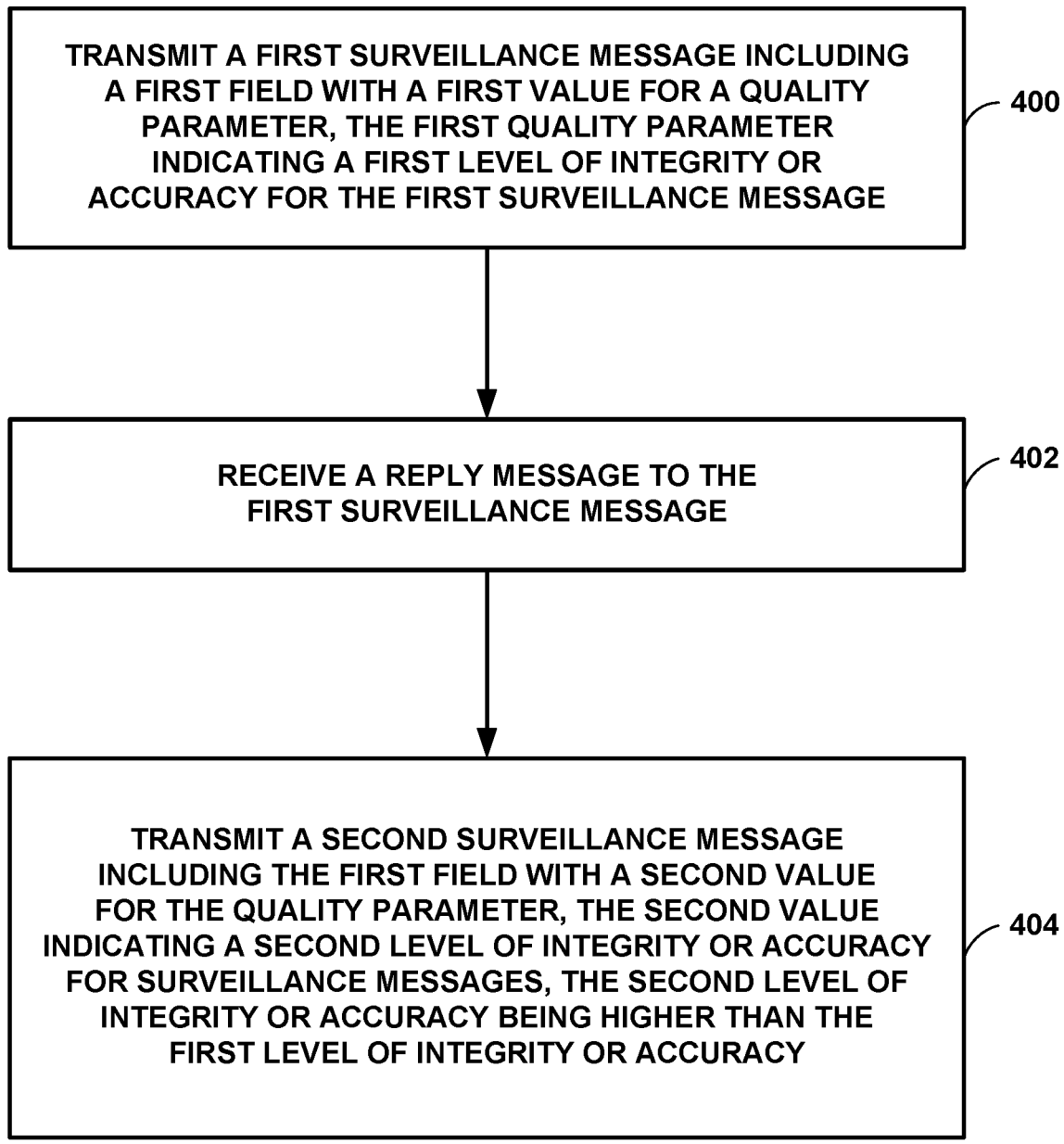
FIG. 4 is a flowchart illustrating an example process for changing the value for a quality parameter in a surveillance message based on receiving a reply message, in accordance with some examples of this disclosure.
Figure 5:
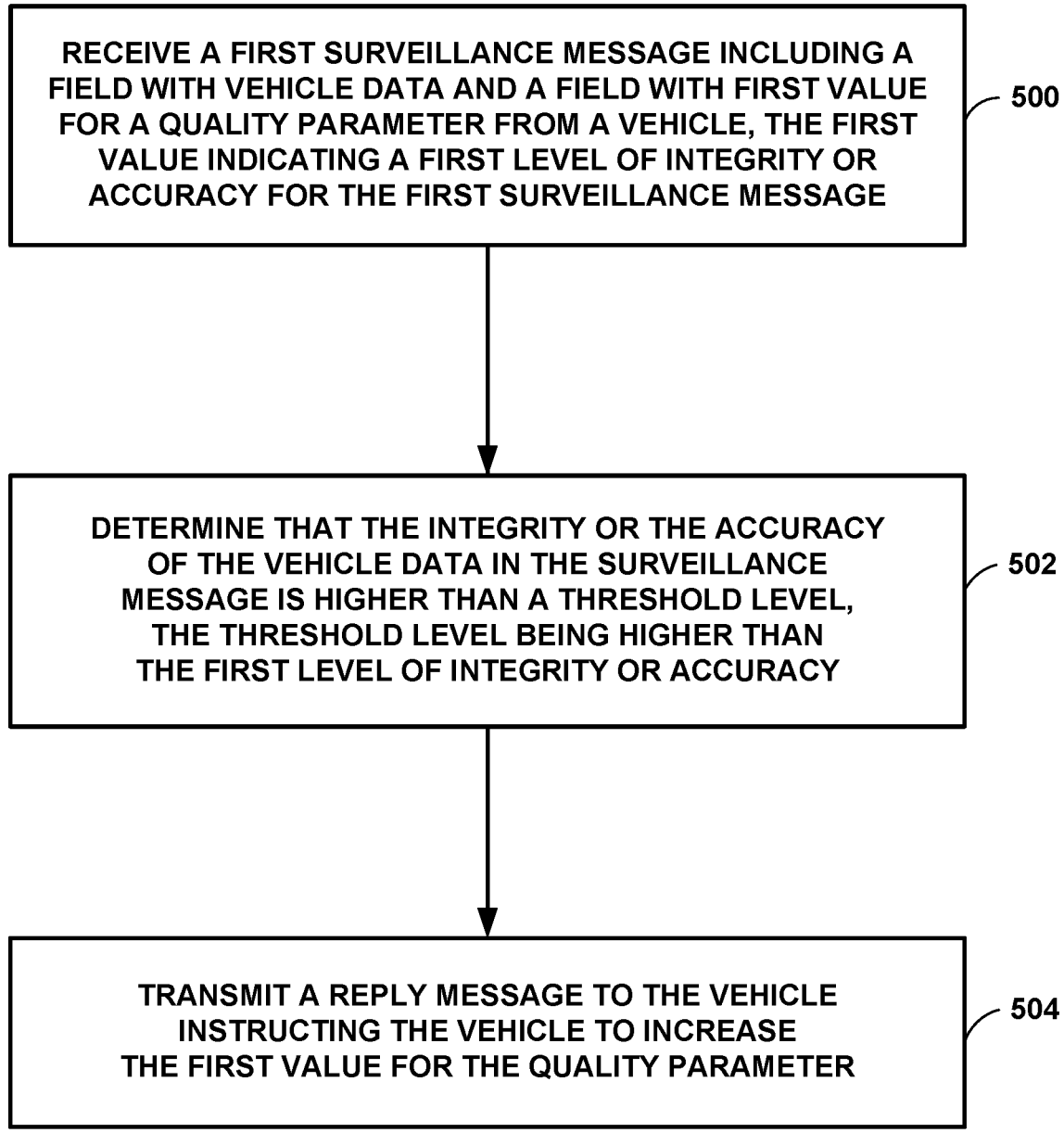
FIG. 5 is a flowchart illustrating an example process for transmitting a reply message instructing a vehicle to change the value for a quality parameter in a surveillance message, in accordance with some examples of this disclosure.
Figure 6:
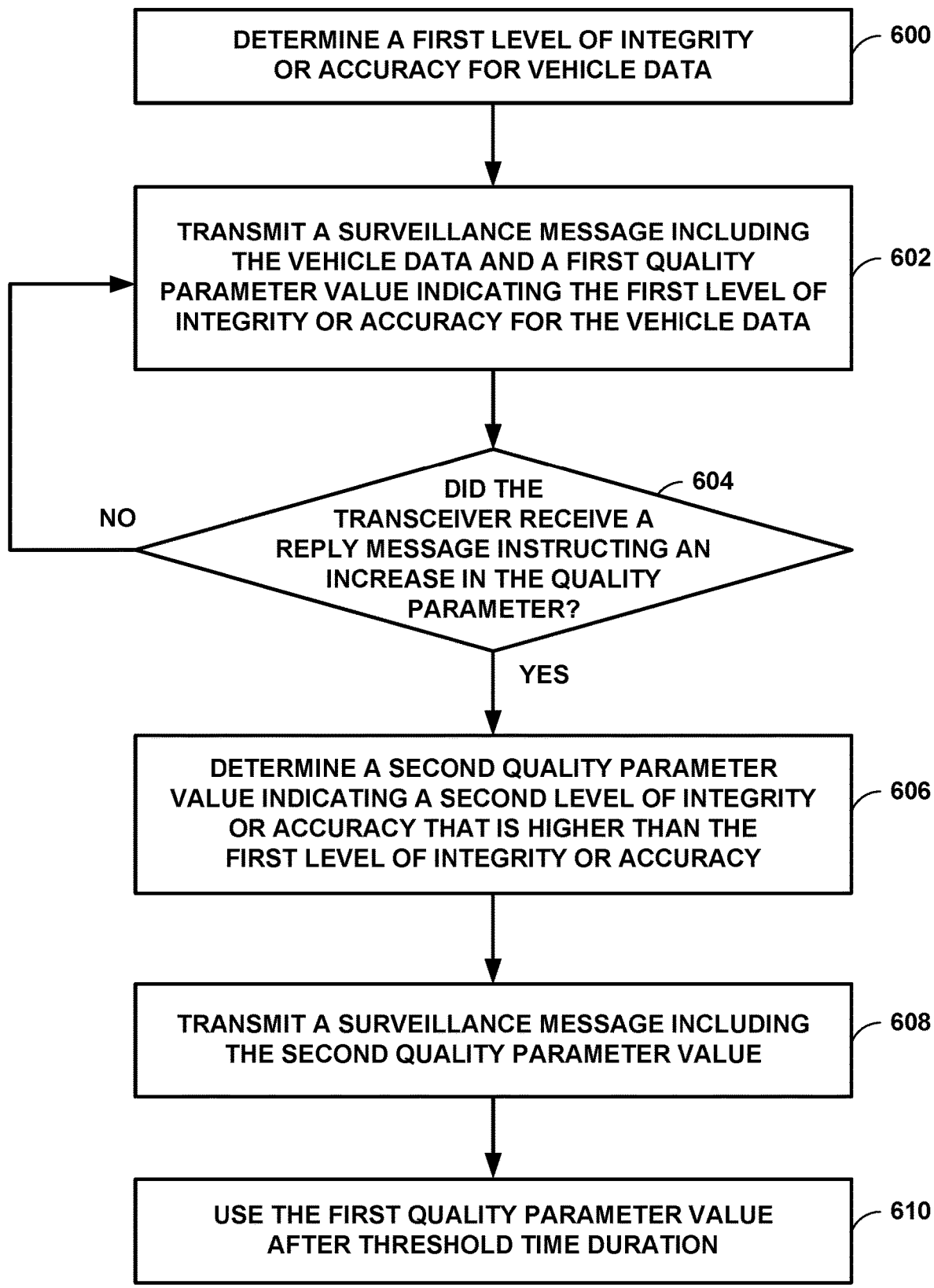
FIG. 6 is a flowchart illustrating an example process for changing the value for a quality parameter in a surveillance message based on receiving a reply message, in accordance with some examples of this disclosure.

FIG. 4 is a flowchart illustrating an example process for changing the value for a quality parameter in a surveillance message based on receiving a reply message, in accordance with some examples of this disclosure. The example processes of FIGS. 4-6 are described with reference to system 210 and navigation system 280 shown in FIG. 2, although other components such as vehicles 100 and 160 and navigation systems 180 and 190 may exemplify similar techniques.

In the example of FIG. 4, transceiver 220 transmits surveillance message 206 including a first field with a first field for the quality parameter to navigation system 280, the first quality parameter indicating a first level of integrity or accuracy for surveillance message 280 (400). Transceiver 220 can send surveillance message 206 as an unprompted broadcast or as a reply to an interrogation by navigation system 280. Surveillance message 206 includes a field with vehicle data indicating, for example, the position, velocity, heading, altitude, and/or destination of vehicle 200.

In the example of FIG. 4, transceiver 220 receives reply message 286 to surveillance message 206 (402). Reply message 286 may include an instruction to increase a quality parameter in surveillance message 206. Through reply message 286, navigation system 280 can instruct processing circuitry 230 to increase the value for any number (e.g., one, two, or all) of the quality parameters in surveillance message 206. Navigation system 280 can also instruct processing circuitry 230 to increase the value for a quality parameter to a specific value for future surveillance messages.

In the example of FIG. 4, transceiver 220 transmits surveillance message 206 including the first field with a second value for the quality parameter, the second quality parameter value indicating a second level of integrity or accuracy for surveillance message 206, the second level of integrity or accuracy being higher than the first level of integrity or accuracy (404). The second level of integrity or accuracy may be sufficient for vehicle 200 to operate in safety-critical areas, such as near airports or in urban areas. Processing circuitry 230 may start or reset a timer in response to determining that transceiver 220 received reply message 280. In response to determining that the timer reaches a threshold value or a threshold timer, processing circuitry 230 can cause transceiver to revert to using the first quality parameter value in subsequent surveillance messages. Thus, reply message 286 causes only a temporary increase in the quality parameter value for transceiver 220.

FIG. 5 is a flowchart illustrating an example process for transmitting a reply message instructing a vehicle to change the value for a quality parameter in a surveillance message, in accordance with some examples of this disclosure. In the example of FIG. 5, navigation system 280 receives surveillance message 206 including vehicle data and a first quality parameter value from vehicle 200, the first quality parameter value indicating a first level of integrity or accuracy for surveillance message 206 (500). The first quality parameter value may indicate that the position data in surveillance message 206 is accurate to within, for example, one kilometer.

Navigation system 280 then determines whether the integrity or the accuracy of the vehicle data in surveillance message 206 is higher than a threshold level, the threshold level being higher than the first level of integrity or accuracy (502). Navigation system 280 can verify or confirm the accuracy of the vehicle data using another data source. Navigation system 280 may determine that the vehicle data is accurate to within one hundred meters, whereas the first quality parameter value indicates an accuracy of one kilometer.

In response to determining that the integrity or the accuracy of the vehicle data is higher than the threshold level, navigation system 280 transmits reply message 286 to vehicle 200 instructing vehicle 200 to increase the quality parameter value in surveillance message 206 (504). In some examples, navigation system 280 instructs vehicle 200 to increase the quality parameter value to a particular value. Through reply message 286, navigation system 280 can instruct vehicle 200 to increase the value for only one quality parameter or the value for multiple quality parameters.

In some examples, navigation system 280 may include more than one transceiver distributed across multiple locations. For example, vehicles, land-based transceivers, marine-based transceivers, and/or airborne-based transceivers can each verify the integrity or accuracy of surveillance message 206. The distributed transceivers can communicate the results of each verification process to a single transceiver for aggregation. The single transceiver can determine whether surveillance message 206 has sufficient integrity or accuracy to warrant an instruction to increase the quality parameter value for surveillance messages transmitted by transceiver 220.

FIG. 6 is a flowchart illustrating an example process for changing the value for a quality parameter in a surveillance message based on receiving a reply message, in accordance with some examples of this disclosure. In the example of FIG. 6, processing circuitry 230 determines a first level of integrity or accuracy for vehicle data (600). Processing circuitry 230 can determine the first level of integrity or accuracy based on a characteristic for positioning device 240, such as a horizontal integrity level or a horizontal protection level for positioning device 240.

Transceiver 220 then transmits surveillance message 206 including the vehicle data and a first quality parameter value indicating the first level of integrity or accuracy for the vehicle data (602). After transceiver 220 transmits surveillance message 206, processing circuitry 230 determines whether transceiver 220 received reply message 286 instructing vehicle 200 to increase the quality parameter value (604). In response to determining that transceiver 220 did not receive reply message 286 instructing vehicle 200 to increase the quality parameter value, processing circuitry 230 continues to use the first quality parameter value in future surveillance messages.

In response to determining that transceiver 220 received reply message 286 instructing vehicle 200 to increase the quality parameter value, processing circuitry 230 determines a second quality parameter value indicating a second level of integrity or accuracy that is higher than the first level of integrity or accuracy (606). In examples in which the value of the first quality parameter is four (e.g., 0100 in binary), processing circuitry 230 can determine that reply message 286 instructs processing circuitry 230 to increase the quality parameter to seven (e.g., 0111 in binary). Processing circuitry 230 then causes transceiver 220 to transmit surveillance message 206 including the second quality parameter value (608).

System 210 uses the second quality parameter value for a threshold time duration before reverting back to using the first quality parameter value (610). Processing circuitry 230 can start or reset a timer in response to transceiver 220 receiving reply message 286. In response to determining that the timer has reached the threshold time duration, processing circuitry 230 can revert to using the first quality parameter value. System 210 may use the second quality parameter value for longer than the threshold time duration in examples in which transceiver 220 receives another reply message 286 instructing vehicle 200 to use the second quality parameter value. System 210 can revert to using the first quality parameter value after vehicle 200 power cycles (e.g., stops operating, powers off, and later powers back on). Thus, an increase in the quality parameter value for one period of operation (e.g., each flight) does not continue on to subsequent periods of operation.

Transceiver 220 can finish transmitting surveillance messages including the second quality parameter value in response to determining that a threshold time duration has elapsed (e.g., by using a timer). Transceiver 220 can finish transmitting surveillance messages including the second quality parameter value in response to a power cycle of vehicle 200 or a power cycle of system 210. Transceiver 220 can finish transmitting surveillance messages including the second quality parameter value in response to receiving a reply message that instructs transceiver 220 to reduce the quality parameter value in surveillance messages. After transceiver 220 finishes transmitting surveillance messages including the second quality parameter value, transceiver 220 can transmit surveillance messages including the first quality parameter value or another quality parameter value.

Example 1. A method includes method includes transmitting, by a transceiver onboard a vehicle, a first surveillance message including a first field with a first value for a quality parameter, the first value for the quality parameter indicating a first level of integrity or accuracy for the first surveillance message. The method also includes receiving, by the transceiver, a reply message to the first surveillance message. The method further includes determining, by processing circuitry coupled to the transceiver, a second value for the quality parameter in response to the transceiver received the reply message, wherein the second value for the quality parameter indicates a second level of integrity or accuracy for surveillance messages transmitted by the transceiver, and wherein the second level of integrity or accuracy is higher than the first level of integrity or accuracy. The method includes transmitting, by the transceiver, a second surveillance message including the first field with the second value for the quality parameter in response to determining the second value.

Example 2. The method of example 1, wherein the first surveillance message and the second surveillance message comprise automatic-dependent surveillance—broadcast messages.

Example 3. The method of example 1 or example 2, wherein the quality parameter comprises a Navigation Integrity Category, a Navigation Accuracy Category for Position, a Navigation Accuracy Category for Velocity, a Source Integrity Level, and/or a System Design Assurance parameter.

Example 4. The method of examples 1-3 or any combination thereof, further including determining that the reply message includes an instruction to increase the first value for the quality parameter.

Example 5. The method of examples 1-4 or any combination thereof, further including transmitting a third surveillance message including the first field with the first value for the quality parameter after the transceiver has finished transmitting surveillance messages including the first field with the second value.

Example 6. The method of examples 1-5 or any combination thereof, further including determining that the transceiver did not receive a reply message to the third surveillance message including an instruction to increase the first field with the first value for the quality parameter.

Example 7. The method of examples 1-6 or any combination thereof, further including transmitting a fourth surveillance message including the first field with the first value for the quality parameter in response to the processing circuitry determining that the transceiver did not receive the reply message to the third surveillance message.

Example 8. The method of examples 1-7 or any combination thereof, further including determining that the reply message includes an instruction to increase the first value of the quality parameter to a particular value.

Example 9. The method of examples 1-8 or any combination thereof, further including transmitting the first surveillance message including a plurality of fields with values for a plurality of quality parameters including the first quality parameter.

Example 10. The method of examples 1-9 or any combination thereof, further including transmitting the second surveillance message including the plurality of fields with values for the plurality of quality parameters.

Example 11. The method of examples 1-10 or any combination thereof, where the reply message includes an instruction to increase values of more than one quality parameter of the plurality of quality parameters Example 12. The method of examples 1-11 or any combination thereof, further including starting a timer in response to the transceiver receiving the reply message.

Example 13. The method of examples 1-12 or any combination thereof, further including causing the transmitter to transmit a third surveillance message including the first field with the first value for the quality parameter in response to determining that the timer reaches a threshold time duration.

Example 14. The method of examples 1-13 or any combination thereof, where receiving the reply message comprises receiving the reply message from a land-based navigation system, a marine-based navigation system, or an airborne-based navigation system.

Example 15. The method of examples 1-14 or any combination thereof, where the first level of integrity or accuracy is not sufficient for the vehicle to operate in a safety-critical area or in a safety-critical system.

Example 16. The method of examples 1-15 or any combination thereof, where the second level of integrity or accuracy is sufficient for the vehicle to operate in a safety-critical area or in a safety-critical system.

Example 17. A system configured to mount on a vehicle includes a transceiver configured to transmit a first surveillance message including a first field with a first value for a quality parameter and a second field with vehicle data, wherein the first value indicates a first level of integrity or accuracy for the first surveillance message. The transceiver is also configured to receive a reply message to the first surveillance message. The system also includes processing circuitry configured to determine a second value for the quality parameter in response to the transceiver receiving the reply message, wherein the second value for the quality parameter indicates a second level of integrity or accuracy for surveillance messages transmitted by the transceiver, and wherein the second level of integrity or accuracy is higher than the first level of integrity or accuracy. The transceiver is configured to transmit a second surveillance message including the first field with the second value for the quality parameter in response to the processing circuitry determining the second value.

Example 18. The system of example 17, where the transceiver and the processing circuitry are configured to perform the methods of examples 1-16 or any combination thereof.

Example 19. A device includes a computer-readable medium having executable instructions stored thereon, configured to be executable by processing circuitry for causing the processing circuitry to cause a transceiver onboard a vehicle to transmit a first surveillance message including a first field with a first value for a quality parameter, the first value for the quality parameter indicating a first level of integrity or accuracy for the first surveillance message. The instructions are also configured to cause the processing circuitry to determine a second value for the quality parameter in response to the transceiver received a reply message to the first surveillance message, wherein the second value for the quality parameter indicates a second level of integrity or accuracy for surveillance messages transmitted by the transceiver, and wherein the second level of integrity or accuracy is higher than the first level of integrity or accuracy. The instructions are also configured to cause the processing circuitry to cause the transceiver to transmit a second surveillance message including the first field with the second value for the quality parameter in response to determining the second value.

Example 20. The device of example 19, where the instructions further cause the processing circuitry to perform the methods of examples 1-16 or any combination thereof.

Example 21. A system comprising means for performing each of the method steps of examples 1-16 or any combination thereof.

Example 22. A system that is configured to be part of a navigation system includes a transceiver configured to receive a first surveillance message including a first field with a first value for a quality parameter and a second field with vehicle data, the first value indicating a first level of integrity or accuracy for the first surveillance message. The system also includes processing circuitry configured to determine that an integrity or an accuracy of the vehicle data in the first surveillance message is higher than a threshold level. The transceiver is further configured to transmit a reply message to the vehicle instructing the vehicle to increase the first value for the first quality parameter in response to the processing circuitry determining that the integrity or the accuracy of the vehicle data in the first surveillance message is higher than the threshold level.

Example 23. The system of example 22, where the threshold level is a higher level of integrity or accuracy than the first level of integrity or accuracy.

Example 24. The system of example 22 or 23, where the transceiver is configured to transmit the reply message including the instruction to increase the first value of the quality parameter to a particular value.

Example 25. The system of examples 22-24 or any combination thereof, where the system is part of a land-based navigation system, a marine-based navigation system, or an airborne-based navigation system.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile random access memory (NVRAM), electrically erasable programmable read-only memory (EEPROM), or flash memory. The computer-readable storage media may be referred to as non-transitory. A programmer, such as patient programmer or clinician programmer, or other computing device may also contain a more portable removable memory type to enable easy data transfer or offline data analysis.

The techniques described in this disclosure, including those attributed to vehicles 100, 160, and 200, system 210, transceiver 220, processing circuitry 230, positioning device 240, memory 250, and/or navigation systems 180, 190, and 280, and various constituent components, may be implemented, at least in part, in hardware, software, firmware or any combination thereof. For example, various aspects of the techniques may be implemented within one or more processors, including one or more microprocessors, digital signal processors (DSPs), application-specific integrated circuit (ASICs), field-programmable gate arrays (FPGAs), or any other equivalent integrated or discrete logic circuitry, as well as any combinations of such components, embodied in programmers, such as physician or patient programmers, stimulators, remote servers, or other devices. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, where the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between vehicles 100, 160, and 200, system 210, transceiver 220, processing circuitry 230, positioning device 240, memory 250, and/or navigation systems 180, 190, and 280. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, vehicles 100, 160, and 200, system 210, transceiver 220, processing circuitry 230, positioning device 240, memory 250, and/or navigation systems 180, 190, and 280, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system configured to mount on a vehicle, the system comprising:
  a transceiver configured to:
    transmit a first surveillance message including a first field with a first value for a quality parameter and a second field with vehicle data, wherein the first value indicates a first level of integrity or accuracy for the first surveillance message; and
    receive a reply message to the first surveillance message; and processing circuitry configured to:
    demodulate the reply message to determine data encoded in the reply message;
    determine that the data encoded in the reply message includes an instruction to increase the first value for the quality parameter; and
    determine a second value for the quality parameter in response to determining that the data encoded in the reply message includes the instruction,
    wherein the second value for the quality parameter indicates a second level of integrity or accuracy for surveillance messages transmitted by the transceiver,
    wherein the second level of integrity or accuracy is higher than the first level of integrity or accuracy, and
    wherein the transceiver is configured to transmit a second surveillance message including the first field with the second value for the quality parameter in response to the processing circuitry determining the second value;
  wherein the processing circuitry is further configured to:
    start a timer in response to the transceiver receiving the reply message; and
    responsive to determining that the timer reaches a threshold time duration, revert to the first value for the quality parameter by causing the transmitter to transmit a third surveillance message including the first field with the first value for the quality parameter.

2. The system of claim 1, wherein the first surveillance message and the second surveillance message comprise automatic-dependent surveillance-broadcast messages.

3. The system of claim 1, wherein the quality parameter comprises:
  a Navigation Integrity Category;
  a Navigation Accuracy Category for Position;
  a Navigation Accuracy Category for Velocity;
  a Source Integrity Level; or
  a System Design Assurance parameter.

4. The system of claim 1, wherein the transceiver is further configured to transmit the third surveillance message including the first field with the first value for the quality parameter after the transceiver has finished transmitting surveillance messages including the first field with the second value,
  wherein the processing circuitry is further configured to determine that the transceiver did not receive a reply message to the third surveillance message including an instruction to increase the first value for the quality parameter, and
  wherein the transceiver is further configured to transmit a fourth surveillance message including the first field with the first value for the quality parameter in response to the processing circuitry determining that the transceiver did not receive the reply message to the third surveillance message.

5. The system of claim 1, wherein the processing circuitry is configured to determine that the instruction to increase the first value for the quality parameter includes a particular value for the second value.

6. The system of claim 1, wherein the quality parameter is a first quality parameter, and wherein the transceiver is further configured to:
  transmit the first surveillance message including a plurality of fields with values for a plurality of quality parameters including the first quality parameter; and
  transmit the second surveillance message including the plurality of fields with values for the plurality of quality parameters.

7. The system of claim 6, wherein the reply message includes the instruction to increase values of more than one quality parameter of the plurality of quality parameters.

8. The system of claim 1, wherein receiving the reply message comprises receiving the reply message from a land-based navigation system, a marine-based navigation system, or an airborne-based navigation system.

9. The system of claim 1,
  wherein the first level of integrity or accuracy is not sufficient for the vehicle to operate in a safety-critical area, and
  wherein the second level of integrity or accuracy is sufficient for the vehicle to operate in the safety-critical area.

10. The system of claim 1, wherein to determine the second value for the quality parameter, the processing circuitry is configured to temporarily increase the first value of the quality parameter to the second value of the quality parameter.

11. A method comprising:
  transmitting, by a transceiver onboard a vehicle, a first surveillance message including a first field with a first value for a quality parameter and a second field with vehicle data, the first value indicating a first level of integrity or accuracy for the first surveillance message;
  receiving, by the transceiver, a reply message to the first surveillance message;
  demodulating, by processing circuitry coupled to the transceiver, the reply message to determine data encoded in the reply message;
  determining, by the processing circuitry, that the data encoded in the reply message includes an instruction to increase the first value for the quality parameter;
  determining, by the processing circuitry, a second value for the quality parameter in response to determining that the data encoded in the reply message includes the instruction, wherein the second value for the quality parameter indicates a second level of integrity or accuracy for the surveillance messages transmitted by the transceiver, and wherein the second level of integrity or accuracy is higher than the first level of integrity or accuracy;
  transmitting, by the transceiver, a second surveillance message including the first field with the second value for the quality parameter in response to determining the second value;
  starting a timer in response to the transceiver receiving the reply message; and
  responsive to determining that the timer reaches a threshold time duration, reverting to the first value for the quality parameter by causing the transmitted to transmit a third surveillance message including the first field with the first value for the quality parameter.

12. The method of claim 11, further comprising:
  transmitting the third surveillance message including the first field with the first value for the quality parameter after finishing transmission of surveillance messages including the first field with the second value;
  determining that a reply message to the third surveillance message was not received including an instruction to increase the first value for the quality parameter; and
  transmitting a fourth surveillance message including the first field with the first value for the quality parameter in response to determining that the reply message to the third surveillance message was not received.

13. The method of claim 11, further comprising determining that the instruction to increase the first value for the quality parameter includes a particular value.

14. The method of claim 11,
  wherein the quality parameter is a first quality parameter,
  wherein transmitting the first surveillance message comprises transmitting the first surveillance message including a plurality of fields with values for a plurality of quality parameters including the first quality parameter, and
  wherein transmitting the second surveillance message comprises transmitting the second surveillance message including the plurality of fields with values for the plurality of quality parameters.

15. The method of claim 11, wherein determining the second value for the quality parameter comprises temporarily increasing the first value of the quality parameter to the second value of the quality parameter.

16. A system configured to be part of a navigation system, the system comprising:
  at least one transceiver configured to receive a first surveillance message including a first field with a first value for a quality parameter and a second field with vehicle data, the first value indicating a first level of integrity or accuracy for the first surveillance message; and
  processing circuitry configured to:
    demodulate the first surveillance message;
    determine the first value for the quality parameter encoded in the first surveillance message;
    determine the vehicle data encoded in the first surveillance message;
    determine that an integrity or an accuracy of the vehicle data in the first surveillance message is higher than a threshold level,
  wherein the at least one transceiver is configured to transmit a reply message to the vehicle instructing the vehicle to increase the first value for the first quality parameter in response to the processing circuitry determining that the integrity or the accuracy of the vehicle data in the first surveillance message is higher than the threshold level;

wherein the processing circuitry is further configured to:
start a timer in response to the transceiver receiving the reply message; and
responsive to determining that the timer reaches a threshold time duration, revert to the first value for the quality parameter by causing the transmitter to transmit a third surveillance message including the first field with the first value for the quality parameter.

17. The system of claim 16, wherein the threshold level is a higher level of integrity or accuracy than the first level of integrity or accuracy.

18. The system of claim 16, wherein the at least one transceiver is configured to transmit the reply message including the instruction to increase the first value for the quality parameter to a particular value.

\* \* \* \* \*

UNITED STATES PATENT AND TRADEMARK OFFICE
CERTIFICATE OF CORRECTION

PATENT NO. : 11,210,959 B2
APPLICATION NO. : 16/516789
DATED : December 28, 2021
INVENTOR(S) : Petr Casek and Eva Gelnarova Page 1 of 1

It is certified that error appears in the above-identified patent and that said Letters Patent is hereby corrected as shown below:

In the Claims

Column 18, Line 50, Claim 1 reads: "the tra nsceiver" should read -- the transceiver --

Column 21, Line 6, Claim 16 reads: "the tra nsceiver" should read -- the transceiver --

Signed and Sealed this
Eighth Day of October, 2024

Katherine Kelly Vidal
*Director of the United States Patent and Trademark Office*